US008020158B2

(12) United States Patent
Xie et al.

(10) Patent No.: US 8,020,158 B2
(45) Date of Patent: Sep. 13, 2011

(54) INSTALLING AND EXECUTING SHARED APPLICATIONS IN SHARED FOLDERS

(75) Inventors: Guohong Xie, Shanghai (CN); Boon-Lock Yeo, Los Altos Hills, CA (US); Gangjiang Li, Shanghai (CN); Jun Wang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 1488 days.

(21) Appl. No.: 10/596,588

(22) PCT Filed: Dec. 17, 2005

(86) PCT No.: PCT/CN2005/002231
§ 371 (c)(1),
(2), (4) Date: Jun. 16, 2006

(87) PCT Pub. No.: WO2007/068147
PCT Pub. Date: Jun. 21, 2007

(65) Prior Publication Data
US 2008/0256532 A1    Oct. 16, 2008

(51) Int. Cl.
*G06F 9/44* (2006.01)
*G06F 9/445* (2006.01)
(52) U.S. Cl. ........................ 717/171; 717/176
(58) Field of Classification Search .......................... None
See application file for complete search history.

(56) References Cited

U.S. PATENT DOCUMENTS

| 5,930,513 | A | * | 7/1999 | Taylor | ............................. 717/174 |
| 6,144,992 | A | * | 11/2000 | Turpin et al. | .................. 709/208 |
| 6,618,857 | B1 | | 9/2003 | Zimniewicz et al. | |

(Continued)

FOREIGN PATENT DOCUMENTS

EP    1492028    12/2004

(Continued)

OTHER PUBLICATIONS

EP Office Action, Mar. 9, 2009, for EP Application No. 05819624.7-1243, 5 pp.

(Continued)

*Primary Examiner* — Jason D Mitchell
(74) *Attorney, Agent, or Firm* — Michael R. Barré

(57) ABSTRACT

Provided are a method, system, and program for installing and executing shared applications in shared folders. A program is installed by a base computer, having a local storage, to a shared folder accessible to multiple client computers over a network. Installing the program adds files for the program to the shared folder and modifies the local device used by the base computer and enables the base computer to run the program by accessing the program files in the shared folder. An image is created of the local device of the base computer including the installed program. The image is provided to the client computers to apply to local devices of the client computers. Applying the image to the local devices of the client computers enables the client computers to access the program files in the shared folder to run the program.

33 Claims, 10 Drawing Sheets

U.S. PATENT DOCUMENTS

| | | | | |
|---|---|---|---|---|
| 6,918,113 | B2* | 7/2005 | Patel et al. | 717/178 |
| 7,543,301 | B2* | 6/2009 | Monnie et al. | 719/312 |
| 2002/0157089 | A1* | 10/2002 | Patel et al. | 717/178 |
| 2002/0165864 | A1* | 11/2002 | Azagury et al. | 707/10 |
| 2003/0088650 | A1 | 5/2003 | Fassold et al. | |
| 2003/0204842 | A1* | 10/2003 | Chenelle et al. | 717/177 |
| 2004/0025154 | A1 | 2/2004 | Sedlack | |
| 2004/0255048 | A1* | 12/2004 | Lev Ran et al. | 709/249 |
| 2006/0168107 | A1* | 7/2006 | Balan et al. | 709/218 |

FOREIGN PATENT DOCUMENTS

| | | |
|---|---|---|
| WO | 2006045217 | 5/2006 |

OTHER PUBLICATIONS

U.S. Appl. No. 11/027,870, filed Dec. 29, 2004, entitled "Apparatus and Method for Incremental Package Deployment", invented by C. Li, J.J. Wang, & J. Mei.

Office Action 2, Apr. 27, 2010, for EP Application No. 05819624.7, 7 pp.

PCT International Search Report and Written Opinion, Aug. 10, 2006, for International Application No. PCT/CN2005/002231.

* cited by examiner

INSTALLING AND EXECUTING SHARED APPLICATIONS IN SHARED FOLDERS

BACKGROUND

In certain network environments, such as Internet cafes, corporate settings, etc., all client systems are required to be loaded with an identical set of system programs (e.g., operating system and drivers) and software applications to provide a uniform environment for all the client computers. System provisioning is the process of installing the identical set of system and application programs on all the client computers to implement the uniform environment. System provisioning may be accomplished by first installing system components (e.g., the operating system, drivers, etc.) and the necessary applications onto a "golden computer". An image may then be taken of the golden computer storage having the installed programs. The identical image from the golden computer may then be loaded onto the local storage devices of the client computers as part of the system provisioning. The copending and commonly assigned patent application titled "Apparatus and Method For Incremental Package Deployment, having U.S. application Ser. No. 11/027,870 and filed Dec. 29, 2004, provides a technique for providing an installation of additional applications on the golden computer to the client computers in an incremental package.

One issue in implementing a uniform computing environment is the ever increasing size of application programs, which requires that the client computers provide sufficient storage space to store such large programs. Certain uniform environments, such as Internet cafes where users are provided access to numerous large computer video game programs and organizations that require access to many large business application programs, require that each client computer includes a substantial amount of storage to store the numerous large applications. Adding sufficient storage space to each of the client computers in such a uniform environment can be costly and substantially raise the cost per client machine and the cost to service the client storage devices.

DETAILED DESCRIPTION

Figure 1:
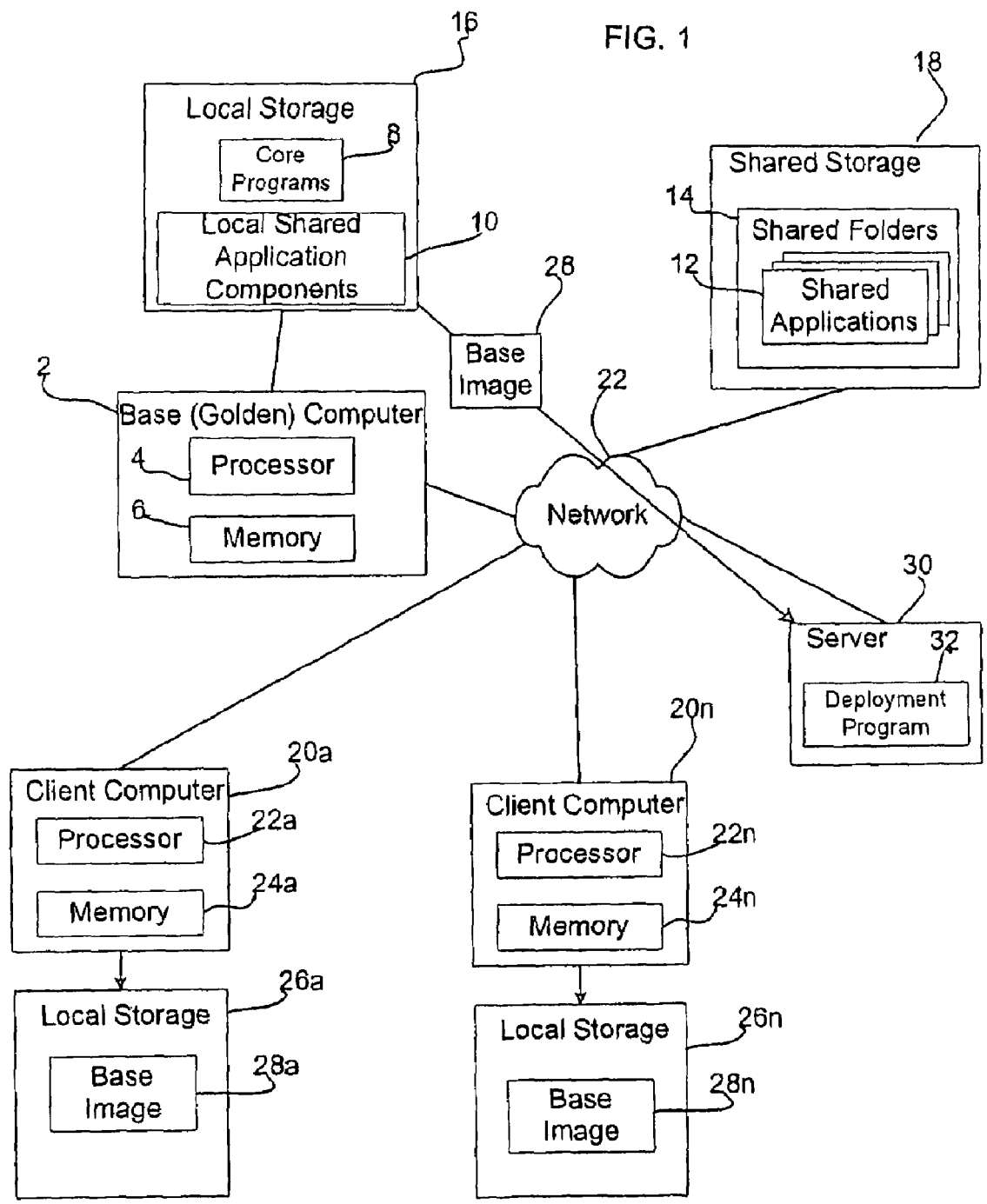
FIG. 1 illustrates an embodiment of a network computing environment.

FIG. 1 illustrates an embodiment of a network computing environment. A base computer 2, also known as the golden computer, includes a processor 4, such as a central processing unit, and a memory 6, such as a volatile memory device used as the system 2 main memory. The base computer 2 has installed core programs 8, such as an operating system and device drivers, etc., and local shared application components 10 for shared application programs 12 installed in a shared folder 14. During initialization, the core programs 8 may be loaded from the local storage 16 into the memory 6 and executed by the processor 4.

The local shared application components 10 comprise those files and configuration settings installed at the base computer 2 when the base computer 2 is used to install the shared applications 12 onto the shared folder 14. Local shared application components 10 installed at the base computer 2 may include library files, system files required when executing the shared applications 12, and configuration settings, such as registry file entries for the shared applications 12. During installation at the base computer 2 of shared applications 12 in the shared folder 14, most of the program files for the shared applications 12 may be stored in the shared folder 14, requiring only a much smaller set of local shared application components 10 to be installed and stored at the base computer 2.

A shared storage 18 is accessible to the base computer 2 and other client computers 20a . . . 20n over a network 22. The shared storage 18 includes folders 14 having shared applications 12 installed by the base computer 2. The client computers 20a . . . 20n include a processor 22a . . . 22n, memory 24a . . . 24n, and local storage 26a . . . 26n, such as a hard disk drive or other storage devices. At some point, a base image 28 may be formed from all the files installed on the base computer 2, including the core programs 8 and files and settings 10. This base image 28 may be supplied to a server 30 over the network 22, and then deployed by a deployment program 32 executing in the server 30 as base images 28a . . . 28n to the client computers 20a . . . , 20n to install at the client computers 20a . . . 20n. The deployment program 32 may also deploy incremental packages of updates to the base image 28 to the client computers 20a . . . 20n.

The base 2 and client 20a . . . 20n computers may be of a same type or configuration and deployed in an Internet cafe where the client computers 20a . . . 20n are used to run computer games and other programs installed as shared applications 12 in the shared folder 14. The base 2 and client 20a . . . 20n computers may exist in other network environments where similar client systems use a same set of application programs, such as a corporate environment or other organizational setting requiring a uniform computing environment.

The base 2 and client 20a . . . 20n computers may comprise computing devices known in the art, such as desktop computers, laptops, servers, hand held computing devices, telephony devices, etc. The server 30 may comprise a server class machine. The network 22 may comprise a Local Area Network (LAN), Intranet, the Internet, Wide Area Network (WAN), peer-to-peer network, wireless network, etc. The shared storage 18 may comprise a suitable type of storage device or devices to store the shared applications 12 that may be accessed over the network 22, such as one or more hard disk drives (e.g. an array of disks, such as a Redundant Array of Independent Disks (RAID)), flash memory, etc. In one embodiment, the server 30 may include a storage controller to manage access to the shared storage 18 or the shared storage 18 may comprise hard disk drives within the server 30.

Figure 2:
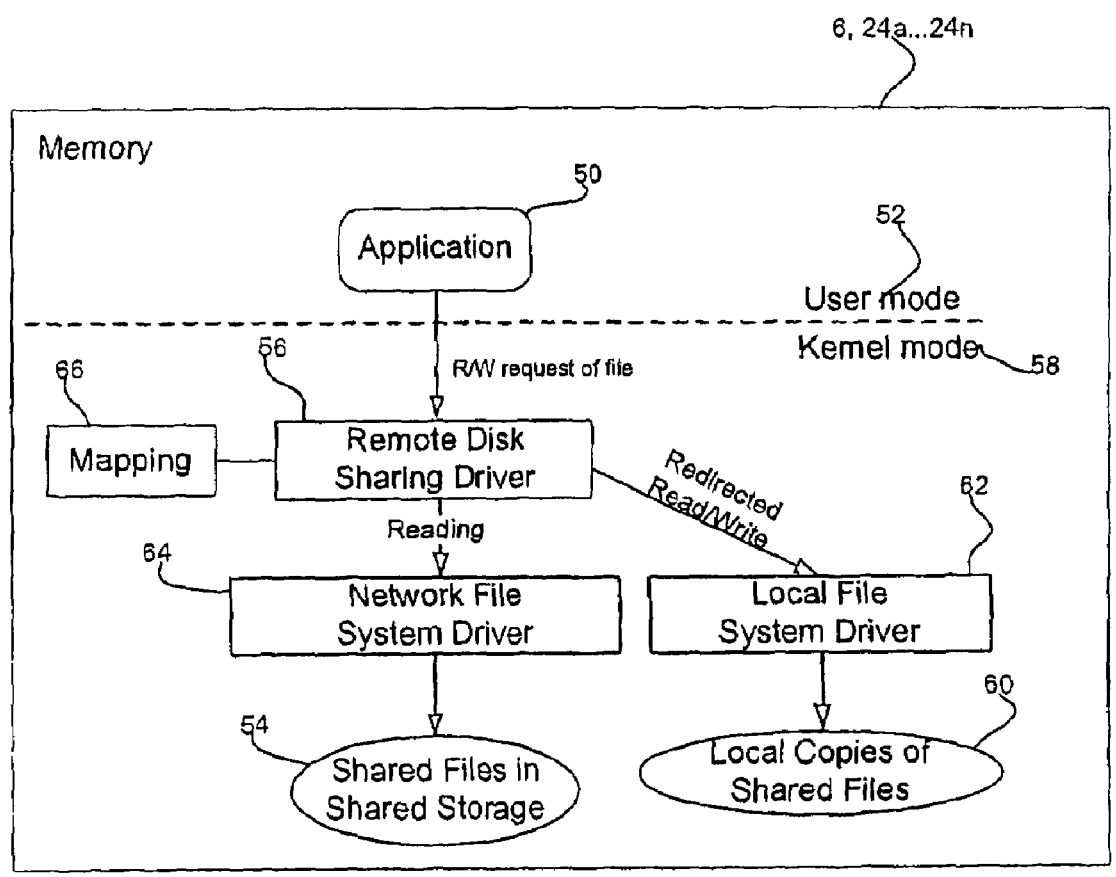
FIG. 2 illustrates an embodiment of components in a memory to access components of shared applications in a shared folder.

FIG. 2 illustrates an embodiment of certain of the core programs 8 loaded into the memories 6, 24a . . . 24n and used to manage read/write requests to shared application 12 components in the shared folders 14. An application 50 executing in a user mode portion of the memory 52, which may comprise the executable files for a shared application 12 accessed from the shared folders 14, may issue a read/write request directed to a file in the shared folder 14. The read/write request toward a shared file 54 in the shared folder 14 is first processed by a remote disk sharing driver 56 executing in a kernel mode 58. The remote disk sharing driver 56 may call a local file system driver 62 to execute the request against a local copy 60 of the requested shared file. If there is no local copy 60 of the requested shared file, then the remote disk sharing driver 56 calls a network file system driver 64 to access the requested shared file 54 from the shared folder 14 to then store as a local copy 60 in a local device, such as a hard disk drive 16, 26a . . . 26n or a local memory 6, 24a . . . 24n. The remote disk sharing driver 56 maintains a mapping 66 of shared files to local copies 58 of the shared files maintained in the local device. The drivers 56, 62, and 64 may be part of the core programs 8 included in the base computer images 28a . . . 28n deployed at the client computers 20a . . . 20n.

Figure 3:
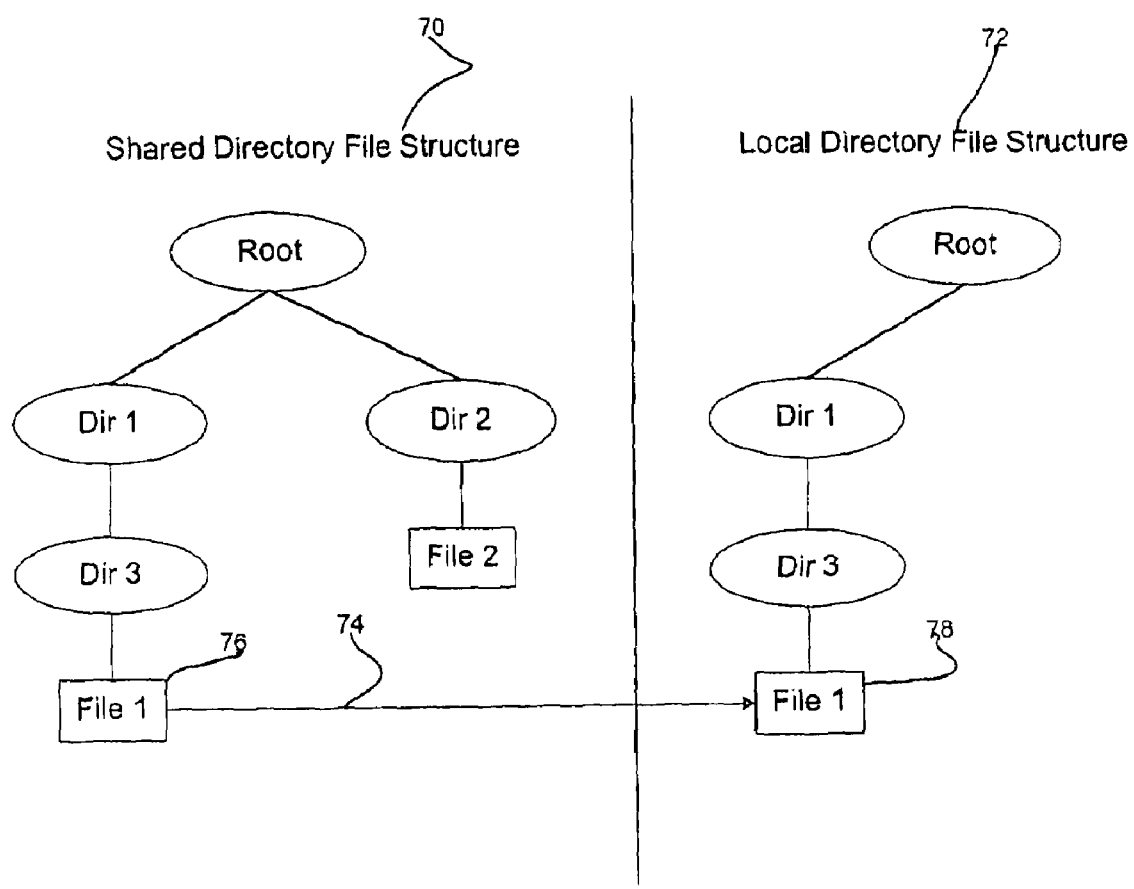
FIG. 3 illustrates an embodiment of how the shared folder directory file structure may map to a local directory file structure.

FIG. 3 illustrates an embodiment of the mapping 66 generated and used by the remote disk sharing driver 56 providing an association of shared files 54 having a local copy 60 in the local device. Shared file directory 70 comprises the file directory structure of the shared folders 14 in the shared storage 18. The local file directory 72 structure indicates the directory structure being generated by the remote disk sharing driver 56 in the local device as files are accessed from the shared storage 54 to provide locally as needed by executing applications 50. Thus, the remote disk sharing driver 56 may generate both the directory structure and files, because a file may be identified by its path as well as file name. The local file directory 72 is only a partial view of the shared file directory 70 if the remote disk sharing driver 56 has not accessed all shared files in the shared folders 14. The mapping 66 provides information 74 associating a shared file 76 with a local copy of the shared file 78. Thus, the mapping may comprises any suitable type of information, data structure, pointer, etc. indicating an association of one shared file with a local copy of the shared file. If there is no mapping information for one shared file 78, then a local copy 78 has not yet been created for the shared file 78.

Figure 4:
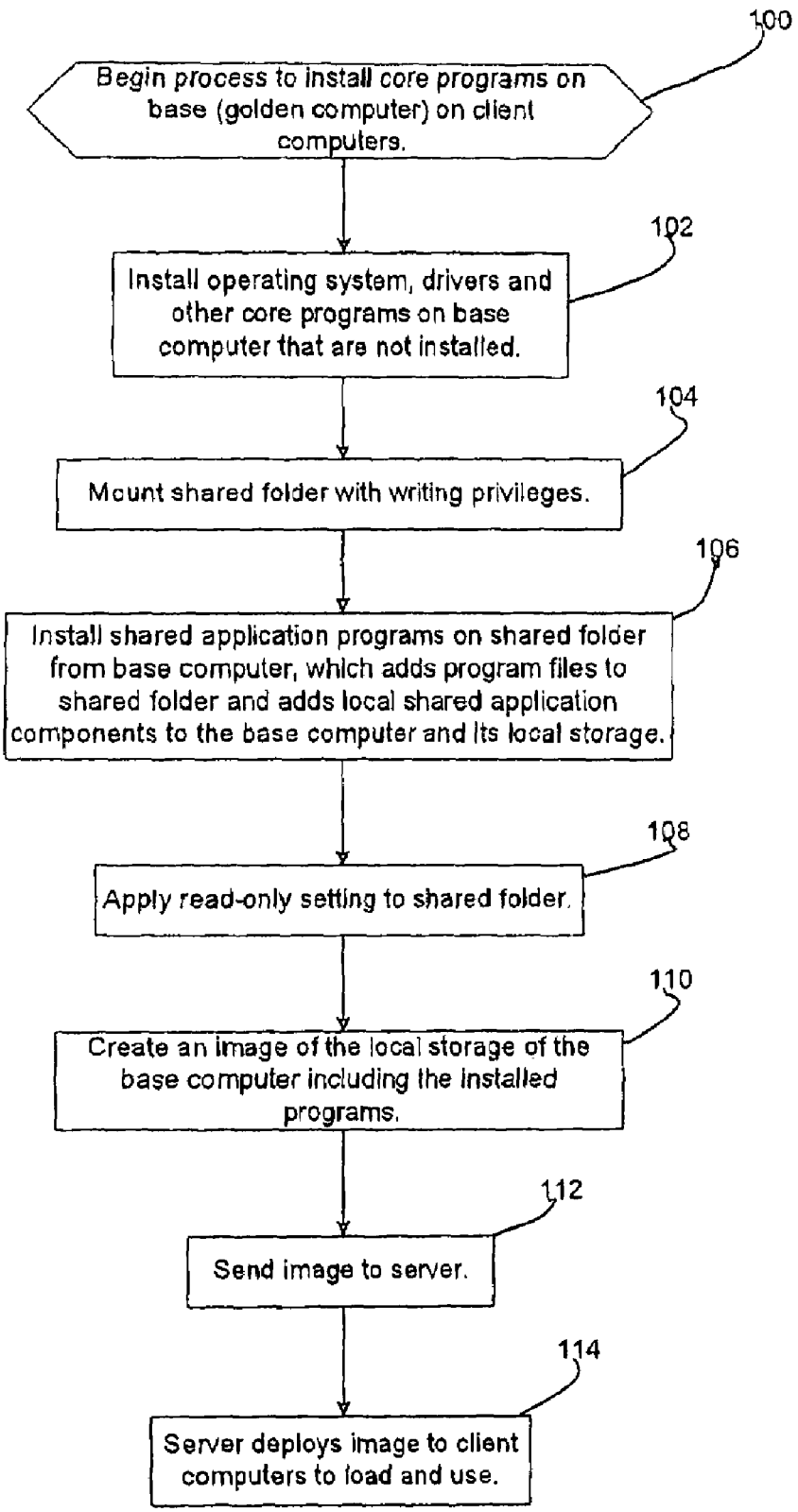
FIG. 4 illustrates an embodiment of operations to deploy an image of a base (golden) computer to client computers in a network.

FIG. 4 illustrates an embodiment of operations performed at the base computer 2 and server 30 to install base images 28a . . . 28n on the client computers 20a . . . 20n. Upon beginning (at block 100) the process, an administrator installs (at block 102) an operating system, drivers and other core programs 8 on the base computer 2 that are not already installed. After the base computer 2 has the desired base installation, including core programs 8 and local shared application components 10, the administrator may mount (at block 104) the shared folder 14 with writing privileges, if it has not already been mounted, and then install (at block 106) shared application 12 programs on shared folders 18 from the base computer 2. This installation adds program files to the shared folders 18, such as the executable files and other related files and adds the local shared application components 10 (e.g., library files, system files, configuration settings, etc.) to the base computer 16. After the programs are installed, the administrator or a program, such as the deployment program 32, may apply (at block 108) a read-only setting to shared folders 14. An image 28 of the local storage 16 of the base computer 2 including the installed core programs 8 and local shared application components 10 is created (at block 110). The base image 28 is sent (at block 112) to the server 30, where the deployment program 32 deploys (at block 114) the base image 28 to the client computers 20a . . . 20n to load into local storage 26a . . . 26n and use as base images 28a . . . 28n.

Figure 5:
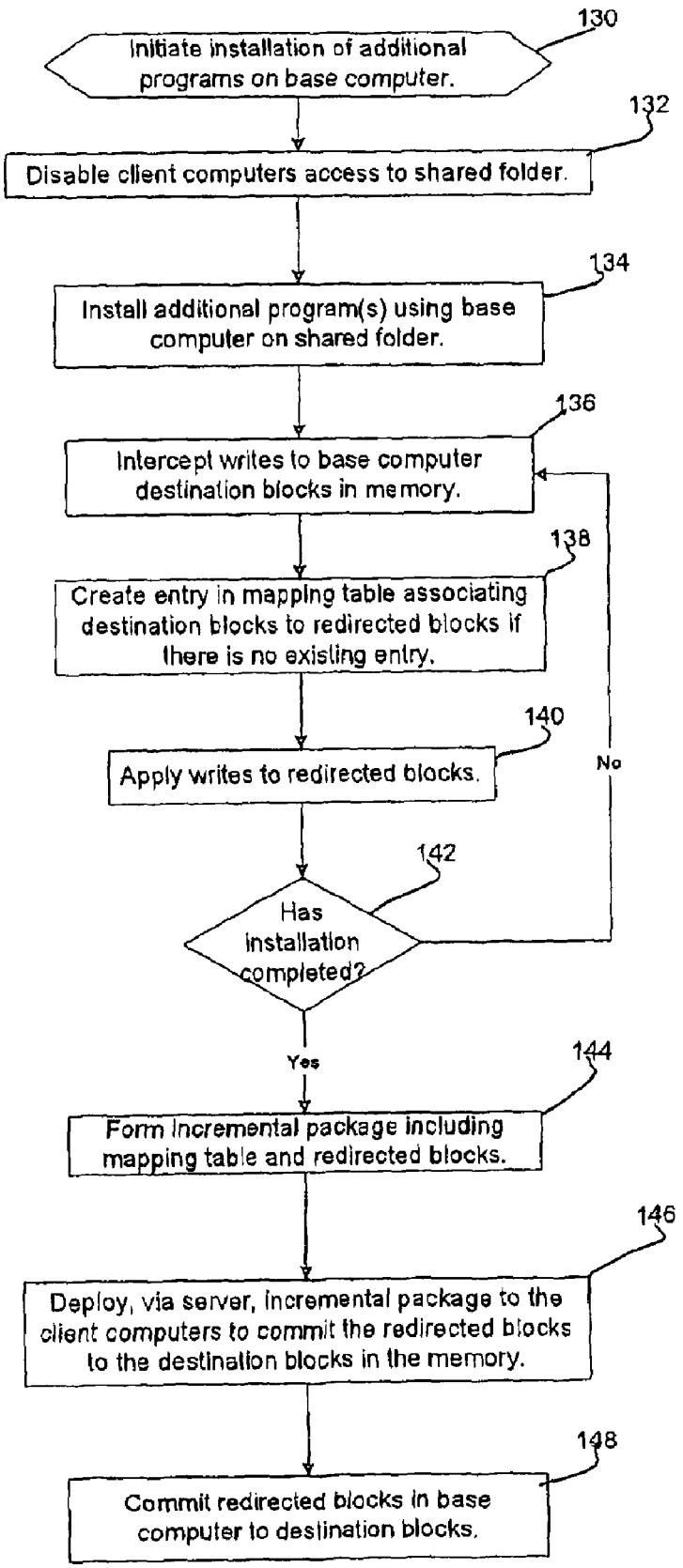
FIG. 5 illustrates an embodiment of operations to deploy additional incremental installations to a base (golden) computer to client computers in a network.
Figure 6:
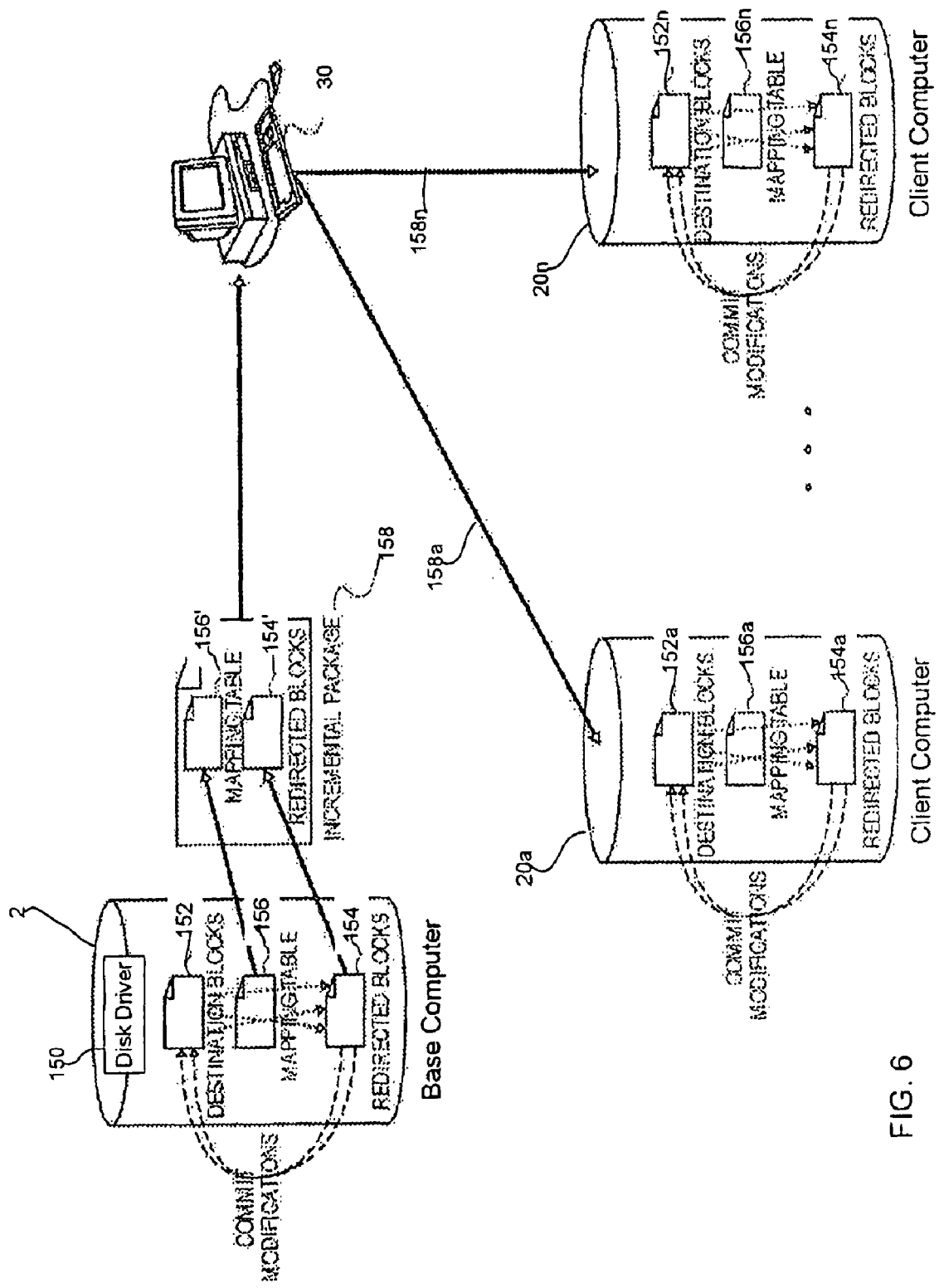
FIG. 6 illustrates an embodiment of a diagram of how incremental installations to the base computer are deployed to the client computers.

FIG. 5 illustrates an embodiment of operations to deploy applications installed in the shared folders 14 from the base computer 12 after the initial installation, such as application programs added at a later point as part of an upgrade. FIG. 6 illustrates the effect of the operations of FIG. 5 in the base 2 and client 20a . . . 20n computers. With respect to FIG. 5, upon initiating (at block 130) operations to install new application in the shared folder 14 from the base computer 2, an administrator disables (at block 132) client computers 20a . . . 20n access to the shared folders 14. The administrator then installs (at block 134) one or more additional program(s) or program upgrades on the shared folder 14 using the base computer 2. The base computer 2 includes a specialized disk driver 150 (FIG. 6) to redirect write requests during the installation to destination blocks 152 to redirection blocks 154, and indicate in the mapping table 156 those destination blocks 152 whose write data is stored in the redirection blocks 154. Upon intercepting (at block 136) writes to base computer destination blocks 152 in memory 6, the disk driver 150 creates (at block 138) an entry in the mapping table 156 associating the destination blocks 152 to which the write is directed to redirected blocks 154 if there is no preexisting entry for the target destination blocks 152. The writes are then applied (at block 140) to the redirected blocks 154. If (at block 142) installation has not completed, then control returns to block 136 to process further writes. Otherwise, if installation has completed, then an incremental package 158 is formed (at block 144) including copies 154' and 156' of the redirected blocks 154 and mapping table 156, respectively, having writes made to the base computer memory 6 during the application upgrade installation. The incremental package 158 is supplied to the server deployment program 32 which then deploys (at block 146) the incremental package 158 to the client computers 20a . . . 20n to commit (at block 148) the redirected blocks 154a . . . 154n loaded into the client memories 24a . . . 24n to the destination blocks 152a . . . 152n in the client memories 24a . . . 24n using the mapping tables 156a . . . 156n. Instances 158a . . . 158n of incremental package 158 are supplied to the client computers 20a . . . 20n, each instance 158a . . . 158n including redirected blocks 154a . . . 154n and the mapping tables 156a . . . 156n. At some point, the writes from the update to the base computer 2 are then moved from the destination blocks 152a . . . 152n in the memories 24a . . . 24n to the non-volatile copy in local storage 26a . . . 26n.

With the embodiments of FIGS. 4, 5, and 6, an administrator may first install application and system programs on the base (golden) 2 to perfect and test the installation. An image of the entire base (golden) computer 2 may then be provided to load onto the client computer local storages 26a . . . 26n. Further, an incremental package 158 of application related components added, e.g., libraries, etc., added to the base computer 2 during an upgrade to the shared applications 12 may be provided to the client computers 20a . . . 20n to load. In this way, most of the shared application 12 components and files are maintained in the shared folders 14, and only certain application components 10, e.g., registry entries, system files, are added to the client computers 20a . . . 20n to use to access and run the shared applications 12. This conserves the amount of space used by the local storage 26a . . . 26n.

Figure 7:
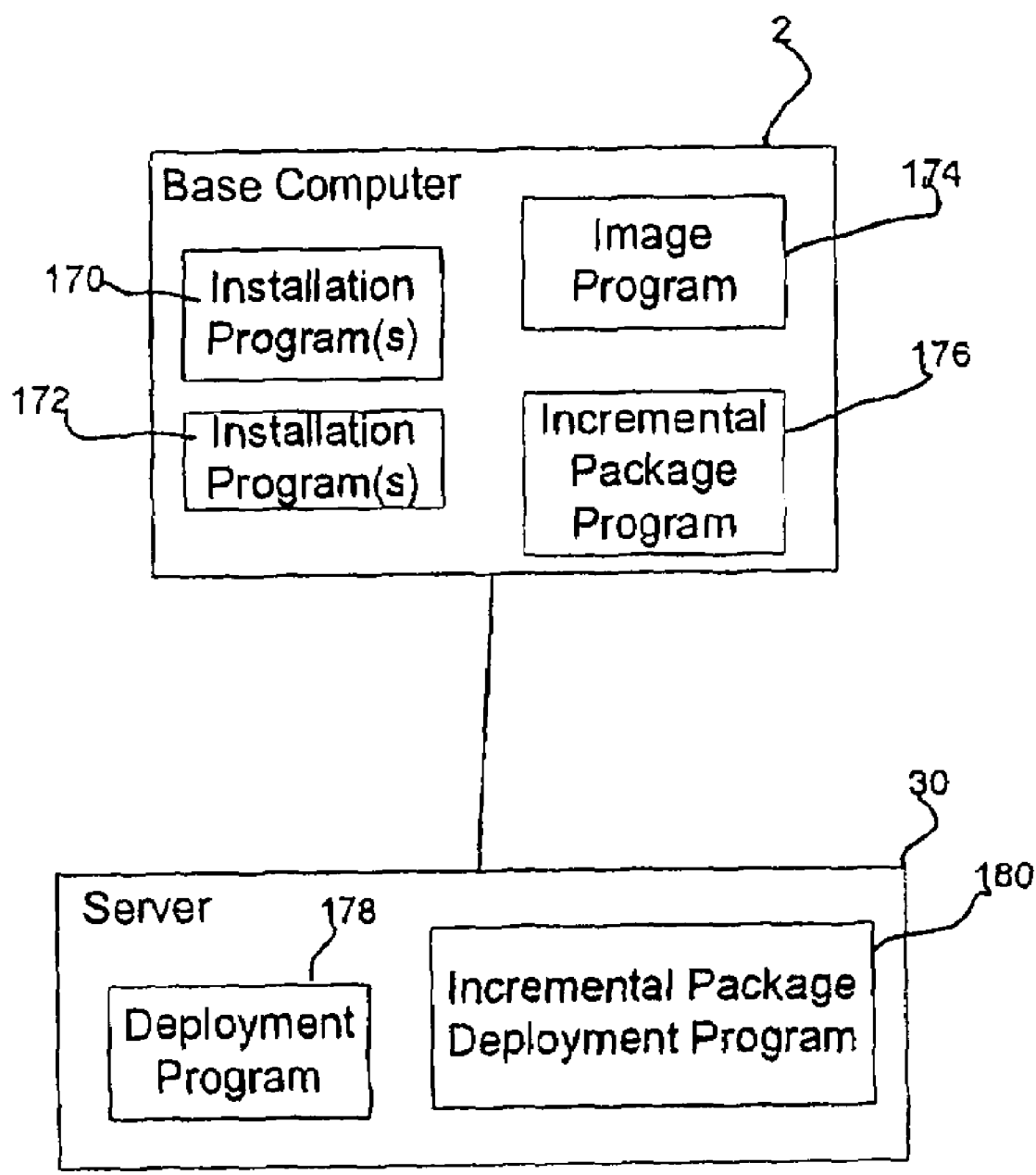
FIG. 7 illustrates an embodiment of components used to create and deploy the base image and incremental packages.

FIG. 7 illustrates an embodiment of components implemented in the base computer 2 and or server 30 to perform the image creation and deployment operations of FIGS. 4, 5, and 6. The base computer 2 is provided one or more installation programs 170 that run on the base computer 2 and are installed on the base computer and/or shared folders 14. The installation program 170 may perform the operations at blocks 102, 104, and 106 of FIG. 4. An image program 174, which may execute on the base computer 2 or the server 30, creates an image of the contents of the local storage 16, or base image 28 (FIG. 1). The image program 174 may perform the operation at blocks 110 and 112 in FIG. 4. A deployment program 180 that runs on the server 30, or alternatively on the base computer 2, may deploy the base image 2 to the client computers 20a . . . 20n as base images 28a . . . 28n. An incremental package program 176 may comprise the disk driver 150 (FIG. 6) to perform the operations of FIG. 5, e.g., operations 152, 154, 156, 158, 160, 162, and 165, to create an incremental package 158 including redirected blocks 154' and mapping table 156'. The incremental package deployment program 180 may deploy the incremental package 158 to the client computers 20a . . . 20n by performing the operations at block 166 in FIG. 5.

Figure 8:
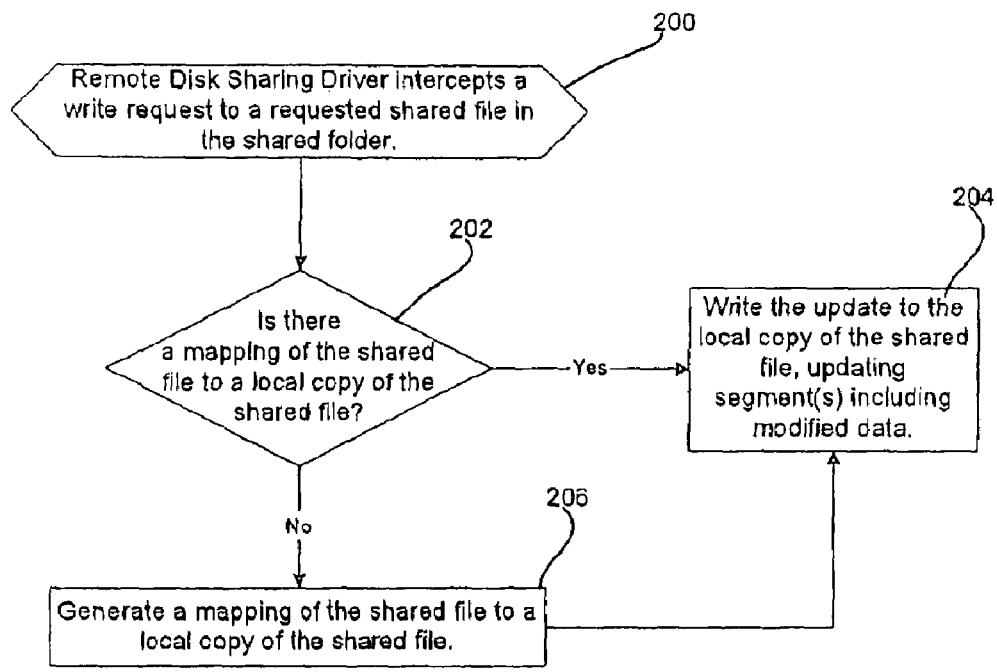
FIG. 8 illustrates an embodiment of operations to write to files in the shared folders.
Figure 9:
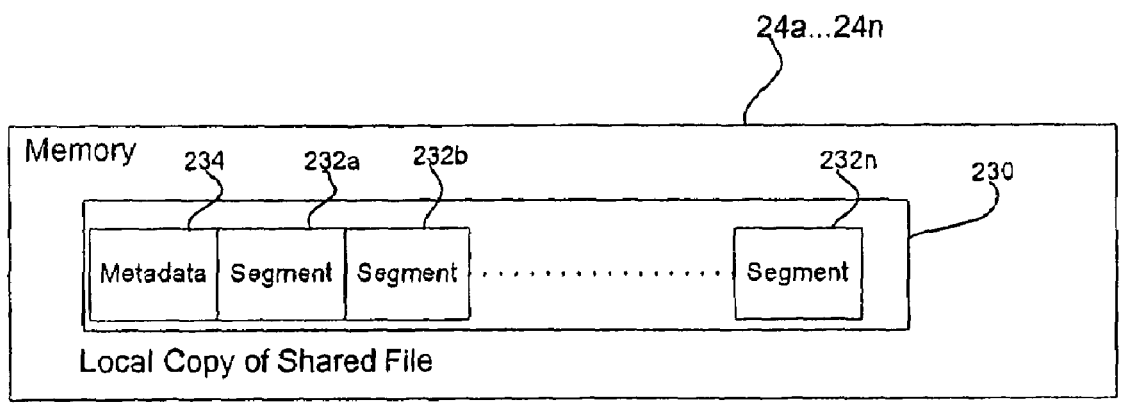
FIG. 9 illustrates an embodiment of how a file is divided into segments.

FIG. 8 illustrates an embodiment of operations performed by the remote disk sharing driver 56 during operations the client computers 20a . . . 20n perform to write data to the files for the shared applications 12 in the shared folders 14. The remote disk sharing driver 56 intercepts (at block 200) a write request from an executing application 50 to a requested shared file in the shared folder 14. The remote disk sharing driver 56 determines (at block 202) whether the mapping 66 provides a mapping of the requested shared file 54 (FIG. 2) to a local copy 60 of the shared file. If so, then the remote disk sharing driver 56 writes (at block 204) the update to the local copy 60 of the shared file, updating segment(s) including the modified data. FIG. 9 shows that a local copy of a file 230 in the memory 24a . . . 24n is comprised of a plurality of segments 232a . . . 232n and includes file metadata 234, such as the number of segments 232a . . . 232n, the number of empty segments and/or segments including data. If (at block 202) there is no local copy 60, then the remote disk sharing driver 56 generates (at block 206) a mapping 74 (FIG. 3) in the mapping 66 of the shared file to a local copy 60 of the shared file. Control then proceeds to block 204 to write the write data to one or more segments 232a . . . 232n in the local copy of the shared file 60.

With the embodiments of FIGS. 8 and 9, the client computers 20a . . . 20n do not alter the contents of the shared folders 14 because all writes to segments of the application 12 components and files in the shared folders 14 are stored and maintained locally. This avoids any write conflicts to the shared folder 14 when the clients are executing shared applications 12 from the shared folders 14.

Figure 10:
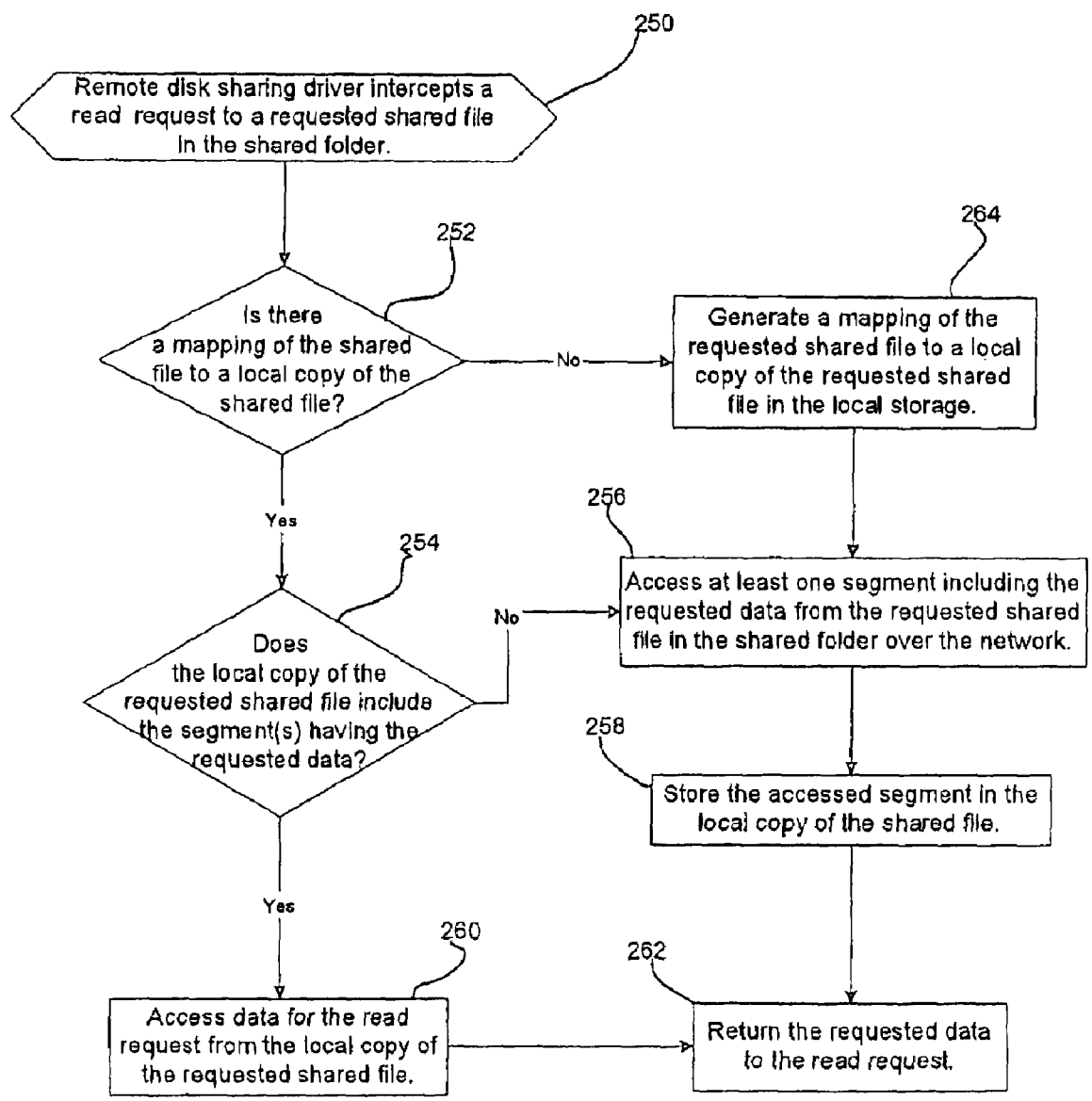
FIG. 10 illustrates an embodiment of operations to read files in the shared folders.

FIG. 10 illustrates operations performed by the remote disk sharing driver 56 during operations the client computers 20a . . . , 20n perform to read data from the files for the shared applications 12 in the shared folders 14. Upon intercepting (at block 250) a read request to a requested shared file in the shared folder 14, the remote disk sharing driver 56 determines (at block 252) whether the mapping 66 includes a mapping of the shared file 54 to a local copy 60 of the shared file. If so, then a determination is made (at block 254) whether the local copy 60 of the requested shared file includes the segment(s) 232a . . . . 232n having the requested data. If (at block 254) the requested segments are not in a local device, e.g., storage 26a . . . 26n or memory 24a . . . 24n, then the remote disk sharing driver 56 accesses (at block 256) the at least one segment 232a . . . 232n including the requested data from the requested shared file 230 in the shared folder 14 over the network 22 and stores (at block 258) the accessed segment 232a . . . 232n in the local copy 60 of the shared file. If there is already data for the accessed segment 232a . . . 232n at the local device, then the requested data accessed from the shared folder may be combined with the data already in the accessed segment 232a . . . 232n.

If (at block 254) the requested segments 232a . . . 232n are in the local device, then data for the read request is accessed (at block 260) from the local copy 60. From block 258 or 260, control proceeds to block 262 to return the accessed data to the read request. If (at block 252) there is no mapping 74 (FIG. 3) in the mappings 66 of the requested shared file to a local copy 60, then the remote disk sharing driver 56 generates (at block 264) a mapping 74 (FIG. 3) of the requested shared file 54 to a local copy 60 of the requested shared file in the local device (e.g., memory 24a . . . 24n or storage 26a . . . 26n). Control then proceeds to block 256 to access the data locally to return.

In further embodiments, the remote disk sharing driver 56 may limit the number of shared files stored locally by deleting local copies 60 on a Last-in-First-Out (LIFO) or least frequently used basis.

With the operations of FIG. 10, segments of shared files 54 in the shared folder 14 are accessed over the network 22 as needed and stored locally to return to read requests. The segments accessed from the shared folders 14 may comprise components of shared applications 12, such as executable files and files used by the executable file, e.g., dynamic linked libraries, images, video, etc. Further, because the client computers 20a . . . 20n only have read access to the shared folders 14 and maintain writes to components of shared application 12 in a local device (e.g., memory 24a . . . 24n or storage 26a . . . 26n) the risk of a conflicting write operation to the shared folders 14 delaying a client's access of a file is substantially reduced. Further, maintaining segments of shared components locally allows for faster local access to those portions of the shared applications 12 accessed frequently. Yet further, downloading components only as needed conserves storage space at the local storage 26a . . . 26n, while at the same time providing access to many shared applications 12 whose direct installation on the client computers 20a . . . 20n would require additional storage space at the client computers.

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

Figure 11:
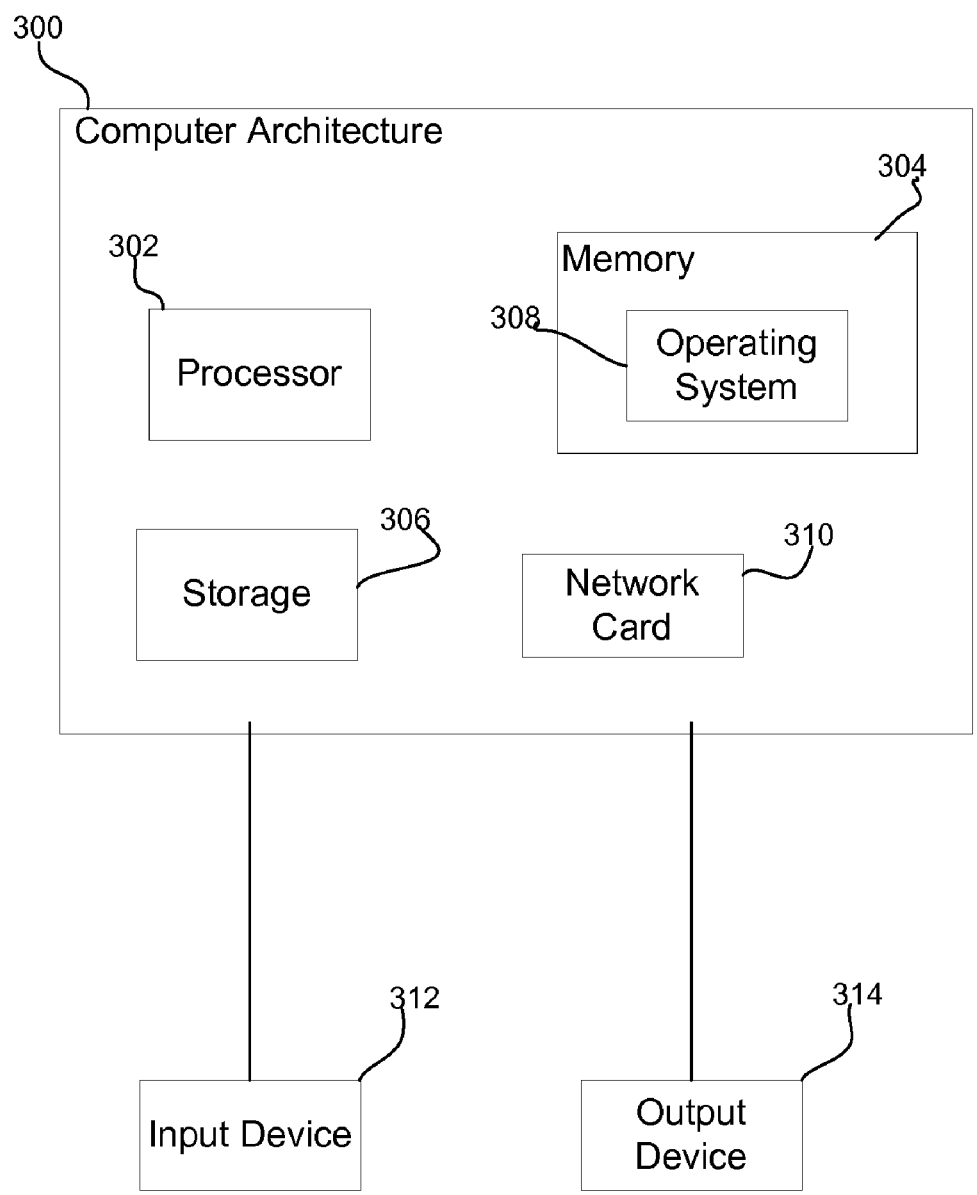
FIG. 11 illustrates an embodiment of a computer architecture that may be used with the described embodiments.

FIG. 11 illustrates an embodiment of a computer architecture 300 that may be implemented at the base 2 and client 20a . . . 20n computers. The architecture 300 may include a processor 302 (e.g., a microprocessor), a memory 304 (e.g., a volatile memory device), and storage 306 (e.g., a non-volatile storage, such as magnetic disk drives, optical disk drives, a tape drive, etc.). The storage 306 may comprise an internal storage device or an attached or network accessible storage. Programs, including an operating system 308 and application programs, in the storage 306 are loaded into the memory 304 and executed by the processor 302 in a manner known in the art. The architecture further includes a network card 310 to enable communication with a network. An input device 312 is used to provide user input to the processor 302, and may include a keyboard, mouse, pen-stylus, microphone, touch sensitive display screen, or any other activation or input mechanism known in the art. An output device 314 is capable of rendering information transmitted from the processor 302, or other component, such as a display monitor, printer, storage, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The variable "n" when used to represent a variable number of an element, e.g., 20a . . . 20n, 232a . . . 32n, etc., may indicate any number of instances of the element, and may indicate different integer numbers when used with different elements or with the same element in different instances.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or that a different number of devices may be used than the multiple number shown.

The functionality and/or the features of a device may be alternatively embodied by one or more other devices which are not explicitly described as having such functionality/features. Thus, other embodiments of the present invention need not include the device itself.

The illustrated operations of FIGS. 4, 5, 8, and 10 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A method to create an image to deploy to client computers that communicate over a network, comprising:
   installing a first program with a base computer, having a local device, wherein the base computer is adapted to access a shared folder accessible to the client computers over a network, wherein installing the first program on the base computer adds shared application components including executable files for the first program to the shared folder and adds local application components of the first program to the local device used by the base computer, and wherein installing the first program enables the base computer to run the first program by accessing the shared application components and local application components of the first program in the shared folder and in the local device;
   creating an image of the local device of the base computer including the local application components of the first program;
   providing the image to the client computers to apply the local application components of the first program to local devices of the client computers, wherein applying the image to the local devices of the client computers enables the client computers to access the shared application components in the shared folder to run the first program, wherein the clients execute the local application components and the shared application components to run the first program;

installing a second program on the base computer to the shared folder, wherein installing the second program adds files for the second program to the shared folder and modifies memory of the base computer, and wherein installing the second program enables the base computer to run the second program by accessing the program files in the shared folder;

determining writes to the base computer memory during installation of the second program on the base computer; and providing the determined writes to the client computers to apply to the client computers, wherein the writes applied to the base computer memory during the installation of the second program are applied to the client computers, and wherein applying the writes to the client computers enables the client computers to access the second program files in the shared folder to run the second program.

2. The method of claim 1, wherein installing the first program on the base computer modifies configuration settings for the base computer stored in the local device and adding files to the local device.

3. The method of claim 1, further comprising:
setting the shared folder to read-only after installing the first program to the shared folder.

4. The method of claim 1, wherein the image includes a driver that when loaded into the client computers causes the client computers to perform:
intercepting a write request to a requested shared file in the shared folder;
generate a mapping of the shared file to a local copy of the shared file in the local devices of the client computers; and
applying the write to the local copy of the shared file in the local devices.

5. The method of claim 1, wherein the image includes a driver that when loaded into the client computers causes the client computers to perform:
intercepting a read request to a requested shared file in the shared folder;
determining whether there is a mapping of the requested shared file to a local copy of the requested shared file;
accessing data for the read request from the local copy of the requested shared file in response to determining that there is the mapping of the requested shared file to the local copy; and
accessing data for the read request from the requested shared file in the shared folder over the network in response to determining that there is no mapping of the requested shared file to the local copy.

6. The method of claim 1, further comprising:
enabling access to the shared folder accessible over the network, wherein a shared file directory structure comprises a file directory structure of the shared folder;
intercepting a write directed to a target shared file comprising one of the shared files in the shared folders;
determining whether there is a mapping of the target shared file in the shared folder to a local copy of the target shared file in a local folder in the local device;
generating a mapping of a file directory structure including the target shared file to a local copy of the file directory structure including a local copy of the target shared file in the local device in response to determining that there is no mapping of the file directory structure of the target shared file to the local copy of the target shared file in the local device, wherein the local copy of the file directory structure provides a partial view of the shared file directory structure if target shared files in the shared file directory structure have not been accessed; and
applying the write to the local copy of the target shared file.

7. The method of claim 6, wherein the write to the local copy in the local device includes only a portion of the target shared file, wherein the target shared file and the local copy of the target shared file comprises a plurality of segments, and wherein applying the write comprises:
applying the write to update at least one of the segments of the local copy of the target shared file.

8. The method of claim 6, further comprising:
receiving a read request to a requested shared file in the shared folder;
determining whether there is a mapping of the requested shared file to a local copy of the requested shared file;
accessing data for the read request from the local copy of the requested shared file in response to determining that there is the mapping of the requested shared file to the local copy; and
accessing data for the read request from the requested shared file in the shared folder over the network in response to determining that there is no mapping of the requested shared file to the local copy.

9. The method of claim 8, wherein the accessed data comprises one of a plurality of segments of the requested shared file, and wherein copying the accessed data to the local copy of the requested shared file comprises copying the accessed segment to the local copy of the shared file in the local device.

10. The method of claim 9, wherein the read request is for requested data in one of the segments of the requested shared file, further comprising:
determining whether the local copy of the requested shared file includes the segment having the requested data in response to determining that there is the mapping of the requested shared file to the local copy;
accessing data from the segment including the requested data in the requested shared file in the shared folder over the network;
returning the requested data from the accessed segment; and
storing the accessed segment in the local copy of the requested shared file.

11. The method of claim 10, wherein storing the accessed segment in the local copy further comprises:
determining whether the local copy includes data for the accessed segment;
applying the data in the local copy to the accessed segment to form a modified segment in response to determining that the local copy includes data for the accessed segment;
storing the modified segment in the local copy in response to forming the modified segment; and
storing the accessed segment in the local copy in response to determining that the local copy does not include data for the accessed segment.

12. A system for creating an image to deploy to client computers that communicate over a network, comprising:
a base computer, having a local device and adapted to access a shared folder over a network, wherein a plurality of client computers are additionally adapted to access the shared folder over the network;

a first installation program adapted to be executed in the base computer to add files for a first program to the shared folder, wherein the first installation program modifies the local device to add shared application components including executable files for the first program to the shared folder and add local application components of the first program used by the base computer to the local device to enable the base computer to run the first program by accessing the shared application components and local application components of the first program in the shared folder and in the local device;

an image creation program adapted to create an image of the local device of the base computer including the local application components of the first program;

a deployment program adapted to communicate the image to the client computers over the network to apply the local application components of the first program to local devices of the client computers, wherein applying the image to the local devices of the client computers enables the client computers to access the shared application components in the shared folder to run the first program, wherein the clients execute the local application components and the shared application components to run the first program;

a second installation program adapted to install a second program on the base computer to the shared folder, wherein installing the second program adds files for the second program to the shared folder and modifies memory of the base computer, and wherein installing the second program enables the base computer run the second program by accessing the program files in the shared folder;

an incremental package program adapted to determine writes to the base computer memory during installation of the second program on the base computer; and an incremental deployment program adapted to provide the determined writes to the client computers to apply to the client computers, wherein the writes applied to the base computer memory during the installation of the second program are applied to the client computers, and wherein applying the writes to the client computers enables the client computers to access the second program files in the shared folder to run the second program.

13. The system of claim 12, wherein installing the first program on the base computer modifies configuration settings for the base computer stored in the local device and adding files to the local device.

14. The system of claim 12, wherein the shared folder is set to read-only after installing the first program to the shared folder.

15. The system of claim 12, wherein the created image includes a driver that when loaded into the client computers is adapted to cause the client computers to perform:
   intercepting a write request to a requested shared file in the shared folder;
   generate a mapping of the shared file to a local copy of the shared file in the local devices of the client computers; and
   applying the write to the local copy of the shared file in the local devices.

16. The system of claim 12, wherein the image includes a driver that when loaded into the client computers causes the client computers to perform:
   intercepting a read request to a requested shared file in the shared folder;
   determining whether there is a mapping of the requested shared file to a local copy of the requested shared file;
   accessing data for the read request from the local copy of the requested shared file in response to determining that there is the mapping of the requested shared file to the local copy; and
   accessing data for the read request from the requested shared file in the shared folder over the network in response to determining that there is no mapping of the requested shared file to the local copy.

17. The system of claim 14, wherein the client computers include:
   a network file system driver executed in the computer and adapted to access the shared folder over the network;
   a local copy of the shared file in the local device;
   a remote disk sharing driver executed in the computer and adapted to:
      intercept a write directed to a target shared file comprising one of the shared files in the shared folder; and
      generate a mapping of a file directory structure including the target shared file to a local copy of the file directory structure including a local copy of the target shared file in the local device in response to determining that there is no mapping of the file directory structure of the target shared file to the local copy of the target shared file in the local device, wherein the local copy of the file directory structure provides a partial view of the shared file directory structure if target shared files in the shared file directory structure have not been accessed; and
   a local file system driver executed in the computer and adapted to apply the write to the local copy of the target shared file.

18. The system of claim 17, wherein the intercepted write to the local copy in the local device includes only a portion of the target shared file, wherein the target shared file and the local copy of the target shared file comprises a plurality of segments, and wherein the local file system driver is adapted to apply the intercepted write by updating at least one of the segments of the local copy.

19. The system of claim 17,
   wherein the remote disk sharing driver is further adapted to receive a read request to a requested shared file in the shared folder and determine whether there is a mapping of the requested shared file to a local copy of the requested shared file;
   wherein the local file system driver is further adapted to access data for the read request from the local copy of the requested shared file in response to the remote disk sharing driver determining that there is the mapping of the requested shared file to the local copy; and
   wherein the network file system driver is further adapted to access data for the read request from the requested shared file in the shared folder over the network in response to the remote disk sharing driver determining that there is no mapping of the requested shared file to the local copy.

20. The system of claim 19, wherein the accessed data comprises one of a plurality of segments of the requested shared file, and wherein copying the accessed data to the local copy of the requested shared file comprises copying the accessed segment to the local copy of the shared file in the local device.

21. The system of claim 20, wherein the read request is for requested data in one of the segments of the requested shared file,
   wherein the remote disk sharing driver is further adapted to determine whether the local copy of the requested shared file includes the segment having the requested data in response to determining that there is the mapping of the requested shared file to the local copy;

wherein the network file system driver is further adapted to access data from the segment including the requested data in the requested shared file in the shared folder over the network, return the requested data from the accessed segment, and store the accessed segment in the local copy of the requested shared file.

22. The system of claim 21, wherein the read request is for requested data in one of the segments of the requested shared file, wherein the remote disk sharing driver is further adapted to determine whether the local copy of the requested shared file includes the segment having the requested data in response to determining that there is the mapping of the requested shared file to the local copy; and wherein the network file system driver is adapted to access data from the segment including the requested data in the requested shared file in the shared folder over the network, return the requested data from the accessed segment, and enable the storing of the accessed segment in the local copy of the requested shared file.

23. An article of manufacture comprising a computer readable medium including code executed to cause operations to be performed, the operations comprising:

installing a first program with a base computer, having a local device, wherein the base computer is adapted to access a shared folder accessible to multiple client computers over a network, wherein installing the first program on the base computer adds shared application components including executable files for the first program to the shared folder and adds local application components of the first program to the local device used by the base computer, and wherein installing the first program enables the base computer to run the first program by accessing the shared application components and local application components of the first program in the shared folder and in the local device;

creating an image of the local device of the base computer including the local application components of the first program;

providing the image to the client computers to apply the local application components of the first program to local devices of the client computers, wherein applying the image to the local devices of the client computers enables the client computers to access the shared application components in the shared folder to run the first program, wherein the clients execute the local application components and the shared application components to run the first program;

installing a second program on the base computer to the shared folder, wherein installing the second program adds files for the second program to the shared folder and modifies memory of the base computer, and wherein installing the second program enables the base computer to run the second program by accessing the program files in the shared folder;

determining writes to the base computer memory during installation of the second program on the base computer; and providing the determined writes to the client computers to apply to the client computers, wherein the writes applied to the base computer memory during the installation of the second program are applied to the client computers, and wherein applying the writes to the client computers enables the client computers to access the second program files in the shared folder to run the second program.

24. The article of manufacture of claim 23, wherein installing the first program on the base computer modifies configuration settings for the base computer stored in the local device and adding files to the local device.

25. The article of manufacture of claim 23, wherein the operations further comprise:

setting the shared folder to read-only after installing the first program to the shared folder.

26. The article of manufacture of claim 23, wherein the image includes a driver that when loaded into the client computers causes the client computers to perform:

intercepting a write request to a requested shared file in the shared folder;

generate a mapping of the shared file to a local copy of the shared file in the local devices of the client computers; and applying the write to the local copy of the shared file in the local devices.

27. The article of manufacture of claim 23, wherein the image includes a driver that when loaded into the client computers causes the client computers to perform:

intercepting a read request to a requested shared file in the shared folder;

determining whether there is a mapping of the requested shared file to a local copy of the requested shared file;

accessing data for the read request from the local copy of the requested shared file in response to determining that there is the mapping of the requested shared file to the local copy; and accessing data for the read request from the requested shared file in the shared folder over the network in response to determining that there is no mapping of the requested shared file to the local copy.

28. The article of manufacture of claim 23, wherein the operations further comprise enabling access to the shared folder including shared files accessible over a network, wherein a shared file directory structure comprises a file directory structure of the shared folder;

intercepting a write directed to a target shared file comprising one of the shared files in one of the shared folders;

determining whether there is a mapping of the target shared file in the shared folder to a local copy of the target shared file in a local folder in the local device;

generating a mapping of a file directory structure including the target shared file to a local copy of the file directory structure including a local copy of the target shared file in the local device in response to determining that there is no mapping of the file directory structure of the target shared file to the local copy of the target shared file in the local device, wherein the local copy of the file directory structure provides a partial view of the shared file directory structure if target shared files in the shared file directory structure have not been accessed; and applying the write to the local copy of the target shared file.

29. The article of manufacture of claim 28, wherein the write to the local copy in the local device includes only a portion of the target shared file, wherein the target shared file and the local copy of the target shared file comprises a plurality of segments, and wherein applying the write comprises:

applying the write to update at least one of the segments of the local copy of the target shared file.

30. The article of manufacture of claim 28, wherein the operations further comprise:

receiving a read request to a requested shared file in the shared folder;

determining whether there is a mapping of the requested shared file to a local copy of the requested shared file;

accessing data for the read request from the local copy of the requested shared file in response to determining that there is the mapping of the requested shared file to the local copy; and accessing data for the read request from the requested shared file in the shared folder over the network in response to determining that there is no mapping of the requested shared file to the local copy.

31. The article of manufacture of claim 30, wherein the accessed data comprises one of a plurality of segments of the requested shared file, and wherein copying the accessed data to the local copy of the requested shared file comprises copying the accessed segment to the local copy of the shared file in the local device.

32. The article of manufacture of claim 31, wherein the read request is for requested data in one of the segments of the requested shared file, wherein the operations further comprise:

determining whether the local copy of the requested shared file includes the segment having the requested data in response to determining that there is the mapping of the requested shared file to the local copy;

accessing data from the segment including the requested data in the requested shared file in the shared folder over the network;

returning the requested data from the accessed segment; and storing the accessed segment in the local copy of the requested shared file.

33. The article of manufacture of claim 32, wherein storing the accessed segment in the local copy further comprises:

determining whether the local copy includes data for the accessed segment;

applying the data in the local copy to the accessed segment to form a modified segment in response to determining that the local copy includes data for the accessed segment;

storing the modified segment in the local copy in response to forming the modified segment; and storing the accessed segment in the local copy in response to determining that the local copy does not include data for the accessed segment.

* * * * *

UNITED STATES PATENT AND TRADEMARK OFFICE
CERTIFICATE OF CORRECTION

PATENT NO. : 8,020,158 B2  
APPLICATION NO. : 10/596588  
DATED : September 13, 2011  
INVENTOR(S) : Xie et al.

Page 1 of 1

It is certified that error appears in the above-identified patent and that said Letters Patent is hereby corrected as shown below:

In claim 12, in column 11, line 30, "enables the base computer run" is corrected to state "enables the base computer to run."

In claim 17, in column 12, line 9, "The system of claim 14" is corrected to state "The system of claim 12."

Signed and Sealed this  
Twenty-second Day of November, 2011

David J. Kappos  
*Director of the United States Patent and Trademark Office*